United States Patent [19]

Swartz

[11] 3,833,297
[45] Sept. 3, 1974

[54] AUTOMATIC BRIGHTNESS CONTROL FOR PHOTOGRAPHIC PROJECTORS

[75] Inventor: James R. Swartz, Lombard, Ill.
[73] Assignee: Sears, Roebuck and Co., Chicago, Ill.
[22] Filed: Mar. 13, 1972
[21] Appl. No.: 234,281

[52] U.S. Cl. .................................. 353/85, 250/205
[51] Int. Cl. .......................................... G03b 21/20
[58] Field of Search .............................. 353/30–37, 353/85–87; 250/205

[56] References Cited
UNITED STATES PATENTS

| 2,953,964 | 9/1960 | Dressen | 353/30 |
| 2,995,978 | 8/1961 | Glandon | 250/205 |
| 3,183,769 | 5/1965 | Kremp | 353/85 |
| 3,215,843 | 11/1965 | Neil | 250/205 |
| 3,558,892 | 1/1971 | Seeley | 250/205 |

FOREIGN PATENTS OR APPLICATIONS 1,272,016   7/1968   Germany .............................. 353/85

Primary Examiner—Louis R. Prince
Assistant Examiner—A. J. Mirabito
Attorney, Agent, or Firm—Arnstein, Gluck, Weitzenfeld & Minow

[57] ABSTRACT

A photographic projector having means for automatically controlling the amount of illumination generated by a projection lamp in accordance with the intensity of the light image of a transparency projected onto a projection lens. The projector in addition to the projection lamp and the projection lens, includes light intensity sensing means and potential control means connected to the light intensity sensing means and the projection lamp for controlling the potential applied to the projection lamp. The light intensity sensing means preferably is a photo-conductive cell, such as a Cadmium-Selenium cell. A solid state circuit is provided for incorporation into the projector as the potential control means.

7 Claims, 2 Drawing Figures

PATENTED SEP 3 1974

3,833,297

AUTOMATIC BRIGHTNESS CONTROL FOR PHOTOGRAPHIC PROJECTORS

BACKGROUND OF THE INVENTION

The present invention relates to photographic projectors which have means for automatically controlling the brightness of the projected light image of a transparency.

Photographic projectors which provide for automatically compensating for variations in the brightness of a projected image are known in the art. Generally the automatic brightness compensation devices utilized in photographic projectors require either sensing the amount of illumination reflected from the viewing screen upon an image of a transparency being projected upon the screen, or require previewing the transparency of which a light image is to be projected. The amount of illumination reflected from a viewing screen is not a true measure of the brightness of a projected light image of a transparency as the amount of light reflected, as sensed at the projector, is affected by the light level in the area and the texture and other reflective properties of the screen. Hence, compensation may be attempted for many uncontrollable factors for which adjustment in brightness need not or cannot be made. The amount of time required for the projection of the light image of a transparency to the screen and sensing the amount of illumination reflected from the screen to the projector as well as the time required in utilizing the sensed amount of illumination to control the intensity of light generated by the projection lamp seriously limits the use of such devices, particularly in motion picture projectors. When used with slide projectors, the time required for the compensation is noticeable as an annoying brightness change during the initial projection of a light image of a slide where the intensity of the light image varies from the compensated intensity of the previous slide. Previewing the transparency is also limited in use as a previewing station must be provided where a light image of the transparency must be previewed prior to projection. The use of the preview station requires that the transparency enter the optical projection path by a defined path, rather than by any of several paths as in some slide projectors, so that the transparency will be illuminated at the preview station in order to predetermine the brightness of a light image projected therefrom. The use of the previewing station also undesirably requires additional elements and a second optical path in addition to the defined transparency transportion path, resulting in projectors of substantially increased cost and complexity.

BRIEF SUMMARY OF THE INVENTION

An object of the invention, therefore, is the provision of apparatus for automatically controlling the brightness of a projected light image of a transparency which utilizes the said light image in effecting the desirable control function.

Another object of this invention is the provision of a photographic projector which automatically controls the brightness of a light image of a transparency being projected therefrom utilizing the said light image along its optical projection path within the projector for effecting the brightness control function.

Further objects and advantages of this invention will become apparent from the following description when the same is considered in connection with the accompanying drawings.

In accordance with the present invention there is provided a photographic projector having projecting means including light source means and projection lens means, for projecting an image of a transparency along an optical projection path, light intensity sensing means mounted adjacent the optical projection path for sensing the intensity of a light image of the transparency projected upon at least a portion of the surface of the projection lens means facing the transparency, and potential control means operably connected to the intensity sensing means for controlling the potential applied to light source means of the projecting means in accordance with the intensity of the light image. The projection lens means is aligned with the light source means along the optical projection path with the transparency interposed in the path between the light source means and the projection lens means.

Photographic projectors, constructed according to the present invention, automatically control the light intensity of a light image of a transparency generated by the projector by sensing the intensity of that light image within the projector. In this manner, the intensity of the light image projected from the projector is adjusted for variations in the "density" of the transparency. "Density" of the transparency is intended to mean the lightness or darkness of the photographic image thereon. Transparencies having normal density provide a satisfactory light image upon projection by a projector for such transparency without having means for compensating for variations in density. A transparency of low density, i.e., a light transparency, provides a light image of relatively high brightness upon projection from such a projector, whereas transparencies of high density, i.e., a dark transparency, will project a relatively dark light image upon projection.

Compensation for variations in density of the transparency is effected by the apparatus of the present invention by sensing the intensity of the light image within the projector and utilizing the sensed value to increase or decrease the potential supplied to the projection light source means so that the compensation for variation in density is not affected by ambient light conditions in the projection area, the texture and reflection characteristics of the screen, and the like, which affect compensation when the light image is sensed upon the viewing screen. In the present invention, the projected light image of the transparency is sensed by the light intensity sensing means along the optical projection path within the projector. Sensing of the light image in this path, eliminates the need for a previewing station and a second optical path as required by many of the other light compensating devices previously known for use with photographic projectors.

It has now been found that the intensity of a light image of a transparency impinging upon projection lens means for projection thereby can be sensed by light intensity sensing means mounted adjacent the optical projection path. Sensing of the intensity of the light image in this manner is unexpected since the rear of projection lens means is usually a surface of one of the projection lens elements through which the light image is intended to pass, rather than be reflected. However, sensing of the light image impinging upon this surface with the light intensity sensing means, such as a photoelectric cell, is sufficient to provide control means in an electrical circuit to compensate for variations in transparency density. Sensing of the intensity of the light image in this manner is even superior to having a portion of the projected light image impinge directly upon a photoelectric cell. In directly receiving the rays, the cell receives only a portion of the light image permitting a false indication of intensity of the light image as, for example, where the projected portion of the light image was generated from a dark portion of a transparency having light portions not accounted for in the sensing. By sensing the entire light image of the transparency projected upon the projection lens means, the apparatus of the present invention provides compensation based upon the density of the transparency as a whole.

BRIEF DESCRIPTION OF A PREFERRED EMBODIMENT

Figure 1:
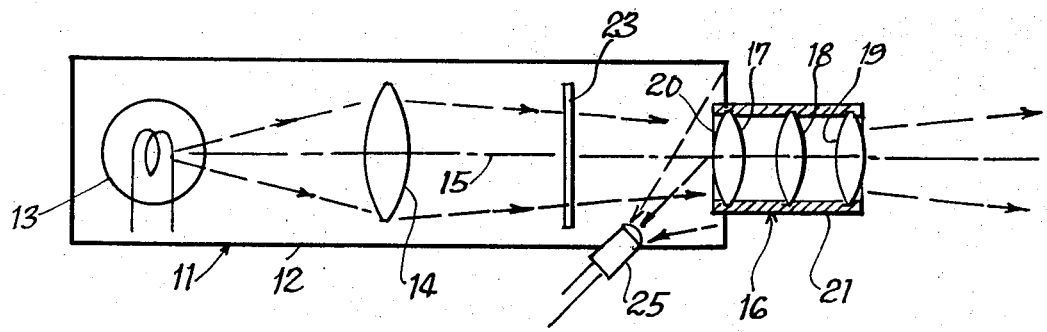
FIG. 1 is a schematic diagram of a photographic projector embodying features of the present invention.

In the particular construction shown in the drawings, the numeral 11 indicates, generally, a photographic projector having a housing 12. Disposed within housing 12 is a projection lamp 13 and a condensing lens 14 optically aligned with lamp 13 along an optical path 15. A projection lens 16 which may include one or more lens elements 17, 18, 19 and a barrel 21 is adjustably mounted in one wall of housing 12 with the elements 17–19 aligned along optical path 15. Projection lens 16 is adjustably mounted in frame 12 to permit adjustment of lens 16 for the purpose of focusing of the light image, the focusing not being pertinent to the present invention. A transparency 23 is removably placed along optical path 15 and is interposed between condensing lens 14 and projection lens 16. It is contemplated that condensing lens 14 may be eliminated in many projectors by the use of specialized projection lamps, in place of projection lamp 13, and therefore, condensing lens 14 and projection lamp 13 may be considered as one element, i.e., light source means, for the purpose of the description of the present invention. Transparency 23 may be a diapositive or positive in the form of a photographic slide, motion picture film, film strip, or in other forms by which photographs or other film-like material through which light passes, can be projected from a projector, for example, a glass slide. It is immaterial to the present invention how transparency 23 arrived into alignment with optical projection path 15. Thus, transparency 23 may have arrived into position interposed between projection lens 16 and condenser lens 14 along optical projection path 15 by being manually placed in that position, or by being positioned therein by a carrier, or being pulled therein as one frame of a film strip or film which succeeded other frames having been pulled through that position. As is known, light emitted by projection lamp 13 and condensed by condensing lens 14 passes through transparency 23 and impinges upon rear surface 20 of element 17 to be projected by elements 17, 18 and 19 for projection along optical projection path 15 outwardly of the projector toward a viewing surface.

In the embodiment shown in the drawings, a photoelectric cell 25 is mounted in housing 12 with the sensing portion of photoelectric cell 25 facing rear surface 20 of element 17. Photoelectric cell 25 can be constructed and positioned in housing 12 so as to sense only the light intensity on rear surface 20 or can be constructed and mounted so as to sense the intensity of light upon rear surface 20 as well as the interior surface of the wall or walls of housing 12 adjacent projection lens 16. Sensing of the light only upon the rear surface of lens element 17 or upon that surface and the adjacent wall surfaces does not detract from the accuracy of the sensing operation since in both cases the intensity of the light image projected from the entire transparency will be sensed. As heretofore described, the light image of the entire transparency impinging upon rear surface 20 is sufficiently reflected from surface 20 so as to provide photoelectric cell 25 with light rays for operation of the photoelectric cell, as will be hereinafter described.

Photoelectric cell 25 may be a vacuum tube photoelectric cell or a photoconductive cell, such as a Cadmium-Selenium photoconductive cell. A photoconductive cell changes its internal resistance in reverse proportion to the amount of light falling upon the cell. Other devices which translate variations in light into corresponding variations in electrical signals can used in place of photoelectric cell 25.

In operation, projection lamp 13 is supplied with a predetermined initial level of potential sufficient to project a light image of a transparency of normal density. The light produced by projection lamp 13 is condensed by condensing lens 14 and directed through transparency 23. Upon passing through transparency 23 the light becomes a light image of the transparency which follows optical projection path 15 through surface 20 of element 17 and elements 18 and 19 along the optical projection path toward the viewing surface (not shown). A portion of the light image impinging upon surface 20 of element 17 is reflected from surface 20 rather than passing therethrough. The reflected light is sensed by photoelectric cell 25. The electrical output of photoelectric cell 25 is electrically connected to projection lamp 13 through an electric circuit so as to control the potential applied to projection lamp 13 in accordance with the intensity of the light rays of the light image reflected from surface 20 and sensed by photoelectric cell 25. Thus, if the transparency is of normal density, photoelectric cell 25 will have a normal output and little or no change will occur in the potential applied to projection lamp 13. However, if transparency 23 has a lower density than the density of a normal transparency, the intensity of reflected light received by photoelectric cell 25 will result in a change in the output of the cell to decrease the potential applied to projection lamp 13 in accordance with the intensity of the light image projected upon surface 20. Conversely, if transparency 23 has a greater density than that of a normal transparency, the intensity of light reflected from surface 20 will be less than normal and photoelectric cell 25 upon sensing the lower intensity of the light image will cause an increase in the potential applied to projection lamp 13. In both cases, the amount of light emitted by projection lamp 13 will be changed to compensate for the lower or higher density of the transparency so as to automatically control the brightness of the projected light image toward a constant value. Desirably, the constant value of brightness is the brightness of the projected light image of a transparency of normal density when projected by the projector with the initial level of potential being applied to projection lamp 13.

Figure 2:
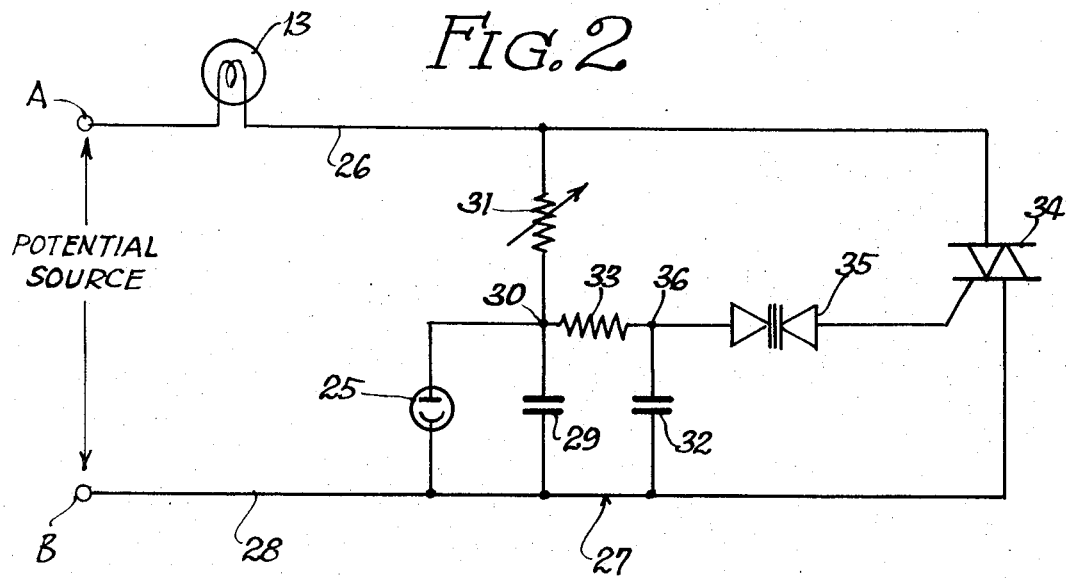
FIG. 2 is a schematic circuit diagram illustrating an electrical circuit for use with the projector of FIG. 1.

An electrical circuit suitable for use with projector 11 to automatically control the brightness of a projected light image of a transparency is illustrated in FIG. 2. As shown, projection lamp 13 is connected to terminal A of a potential source and via connector 26 to the remainder of the circuit, indicated by numeral 27, generally, which constitutes potential control means. Circuit 27 includes a connection 28 connected to terminal B of the potential source. A first capacitance 29 and a first resistance 31 are connected in series between connectors 28 and 26. A second capacitance 32 and a second resistance 33 are connected in series with each other and together are connected in parallel with first capacitance 29. A triac 34 is connected between connectors 26 and 28 and a diac 35 is connected between the triac 34 and junction 36 between second capacitance 32 and second resistance 33. Photoelectric cell 25 is connected between connector 28 and junction 30 between first capacitance 29 and first resistance 31. First resistance 31 may desirably be variable so that the circuit can be subjectively adjusted for the projection of a light image of a transparency having normal density by projector 11.

In operation, resistance 31 is selected or adjusted, if variable, to apply an initial potential to projection lamp 13. The resistance of first resistance 31 together with the resistance of photoelectric cell 25 controls the conduction time of triac 34. Triac 34 controls the complete alternating current wave from the potential source to projection lamp 13. As known, the conduction time of the triac determines the effective or R.M.S. alternating current voltage of the triac circuit. If photoelectric cell 25 is of the photoconductive type, the cell has the ability of changing its internal resistance in inverse proportion to the amount of light falling upon it. Thus, with a dark transparency, i.e. having high density, cell 25 senses less reflected light than normal, increasing its internal resistance. The increase in internal resistance increases the resistance between conductor 26 and junction 30 lengthening the conduction time of the triac 34 which increases the effective voltage supplied to projection lamp 13. Conversely, with a light transparency, i.e. having low density, cell 25 senses more light than would be sensed for a transparency of normal density, resulting in a decrease in the internal resistance of the cell. The decrease in resistance between conductor 26 and junction 30 shortens the conduction time of the triac, resulting in a decrease in the effective voltage supplied to projection lamp 13.

It has been found that by providing a potential approximately equal to 75 percent of the rated voltage of the projection lamp for projecting a light image of a transparency of normal density as an initial condition, the projector including the potential control circuit described above provides satisfactory automatic brightness control. Moreover, since the projection lamp operates at a voltage lower than its rating for a substantial portion of its operation, and thus operates at a lower temperature, projection lamp life is increased. Total response time for adjustment of the brightness control is limited only by the projection lamp itself since the electronic portion of the system reacts almost instantaneously. The limitation in response time by the projection lamp is dependent upon the time required by the lamp filaments to heat or cool to the proper level. Laboratory tests have shown that this time is less than 100 milliseconds. For example, in the case of a movie projector for 8 millimeter film, by use of the circuit and apparatus described above, the brightness correction would be completed within the first two frames of a new scene, a time lapse hardly noticeable by the viewer.

Exemplary of the preferred embodiment of the present invention described above, the apparatus and circuit described above were installed in a slide projector distributed by Sears, Roebuck and Co., Chicago, Illinois, Projector No. 9853 using a type DFG lamp rated at 120 volts. The projector was modified by installing a photocell, Model No. VT 512L, manufactured by Vactec, Inc., Maryland Heights, Missouri, U.S.A., in the cavity between the slide plane and the projection lens, but out of the optical projection path. The photocell was positioned to sense the light reflected from the rear surface of the projection lens. The circuit illustrated in FIG. 2 was wired between the photocell, the projection lamp, and the potential source, with components of the circuit identified as follows:

| Reference Numeral | Description | Manufacturer | Manufacturer's Part No. |
|---|---|---|---|
| 34 | Triac | General Electric Co. Syracuse, N.Y. U.S.A. | SC 41 B |
| 35 | Diac | General Electric Co. Syracuse, N.Y. U.S.A. | ST-2 | and with the other components of the circuit having the following values:

| Reference Numeral | Description | Value |
|---|---|---|
| 29 | First Capacitance | 0.1 Microfarad (100 volts) |
| 31 | First Resistance | 1000 Ohms |
| 32 | Second Capacitance | 0.1 Microfarad (100 volts) |
| 33 | Second Resistance | 2200 Ohms |

Operation of the projector as described above provided excellent results with brightness control occurring within 75 to 100 milliseconds. The photocell yielded 5,000 Ohms with a transparency of normal density, 2,000 Ohms for an over-exposed (low density) slide and 10,000 Ohms for an under-exposed (high density) slide.

Various changes coming within the spirit of my invention may suggest themselves to those skilled in the art; hence, I do not wish to be limited to the specific embodiment shown and described or uses mentioned, but intend the same to be merely exemplary, the scope of my invention being limited only by the appended claims.

I claim:

1. A photographic projector comprising a. projecting means for projecting an image of a transparency along an optical projection path, said projecting means comprising
  i. light source means for illuminating a transparency optically aligned with said light source means in said optical projection path, and
  ii. projection lens means for projecting an image of the transparency, said projection lens means being aligned with said light source means along said optical projection path with the transparency interposed in said optical projection path between said light source means and said projection lens means;
b. light intensity sensing means mounted adjacent to and offset from said optical projection path for sensing the intensity of a light image of the transparency projected upon and reflected from at least a portion of a surface of said projection lens means facing the transparency prior to passage of said light image through said projection lens means; and
c. potential control means operably connected to said light source means and said intensity sensing means for controlling the potential applied to said light source means in accordance with the intensity of the light image projected upon at least said portion of said surface of said projection lens means.

2. The photographic projector of claim 1, wherein said light source means is of the incandescent filament type.

3. The photographic projector of claim 1, wherein said projection lens means is mounted in a first wall of a housing and said light intensity sensing means is mounted on another wall of said housing and is adapted to sense the intensity of a light image projected upon said projection lens means and said first wall.

4. The photographic projector of claim 1, wherein said light source means is connected to a source of alternating potential by a common terminal and said potential control means, and said potential control means comprises a terminal connection to another terminal of the source of alternating potential, a first capacitance and a first resistance connected in series between said terminal connection and said light source means, a second capacitance and a second resistance connected in series with each other and together in parallel with said first capacitance, a triac connected between said terminal connection and said light source means, and a diac connected between said triac and the junction between said second capacitance and said second resistance, said intensity sensing means being connected in parallel with said first capacitance whereby the alternating potential supplied to said light source means is controlled in accordance with the intensity of the light image sensed by said intensity sensing means.

5. The photographic projector of claim 4, including means for varying said first resistance to selectively adjust the potential supplied to said light source means.

6. The photographic projector of claim 4 wherein said intensity sensing means comprises a photoelectric cell.

7. A photographic projector comprising
a. projecting means for projecting an image of a transparency along an optical projection path, said projecting means comprising
  i. a housing,
  ii. light source means disposed at least partially within said housing for illuminating a transparency removably disposed within said housing and optically aligned with said light source means in said optical projection path, and
  iii. projection lens means disposed at least partially within said housing for projecting an image of the transparency outwardly of said housing, said projection lens means being aligned with said light source means along said optical projection path with the transparency interposed in said optical projection path between said light source means and said projection lense means;
b. light intensity sensing means mounted adjacent to and offset from said optical projection path for sensing the intensity of a light image of the transparency projected upon and reflected from at least a portion of a surface of said projection lens means facing the transparency and a portion of said housing adjacent said projection lens means prior to passage of said light image through said projection lens means; and
c. potential control means operably connected to said light source means and said intensity sensing means for controlling the potential applied to said light source means in accordance with the intensity of the light image projected upon at least said portion of said surface of said projection lens means and said portion of said housing adjacent said projection lens means.

* * * * *